Feb. 12, 1957 W. A. GUEFFROY 2,781,122
APPARATUS FOR TIMING AND FEEDING ARTICLES
Filed Dec. 11, 1952 4 Sheets-Sheet 2
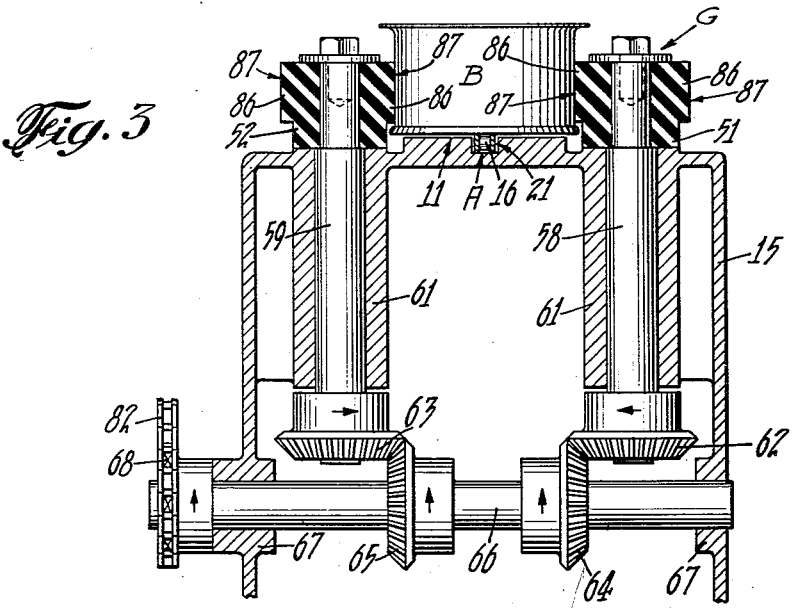
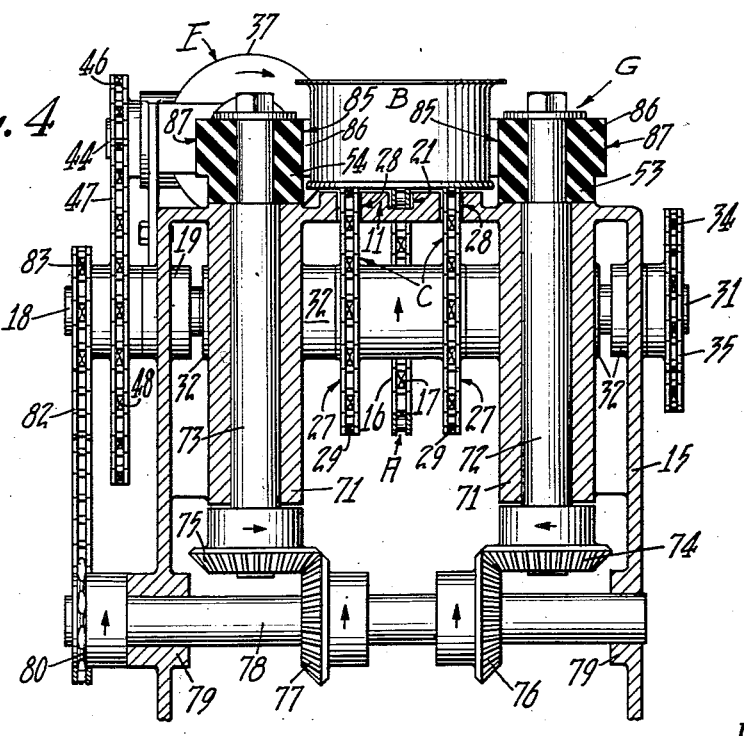
INVENTOR.
WALTER A. GUEFFROY
BY
ATTORNEYS

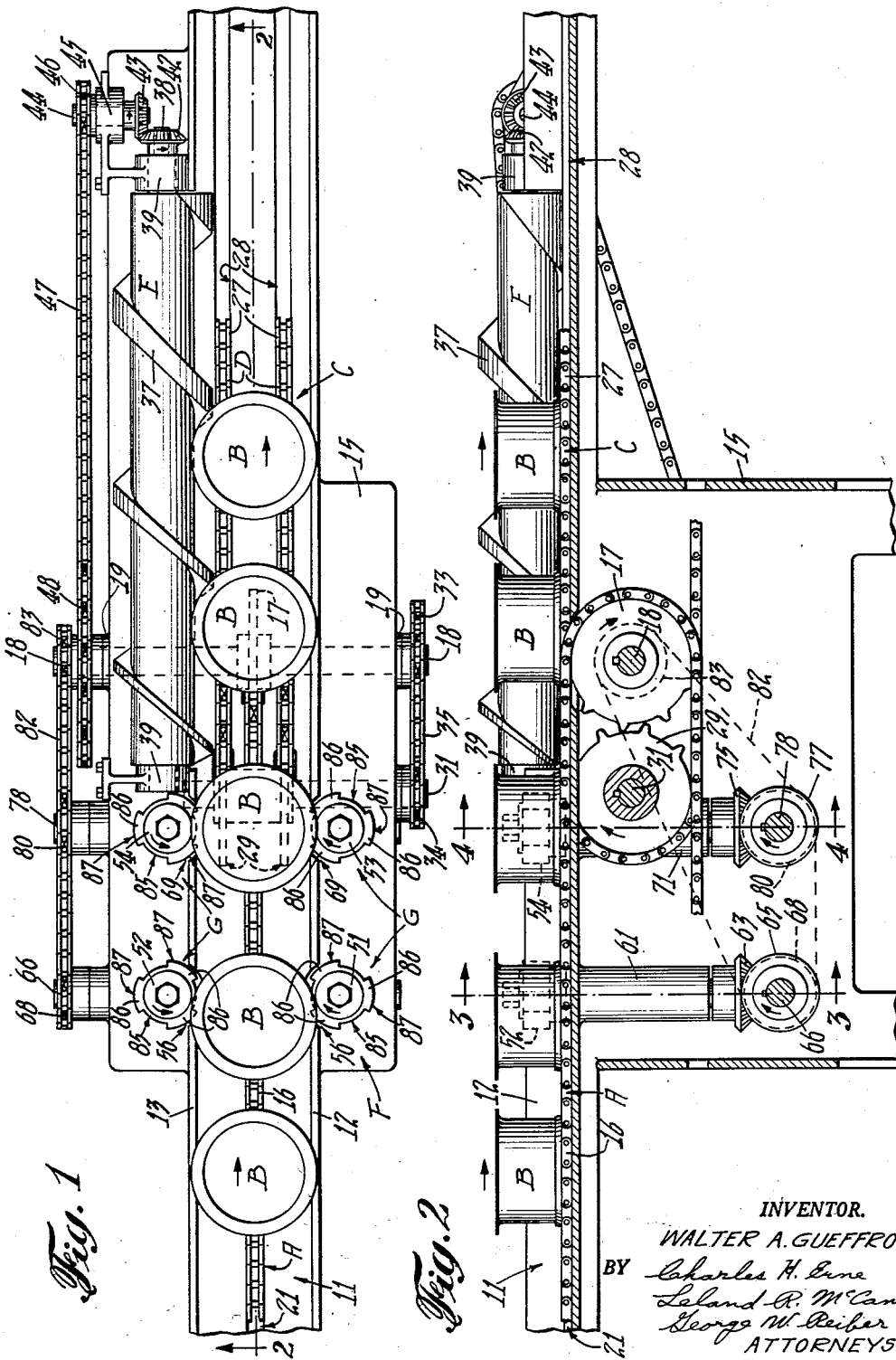

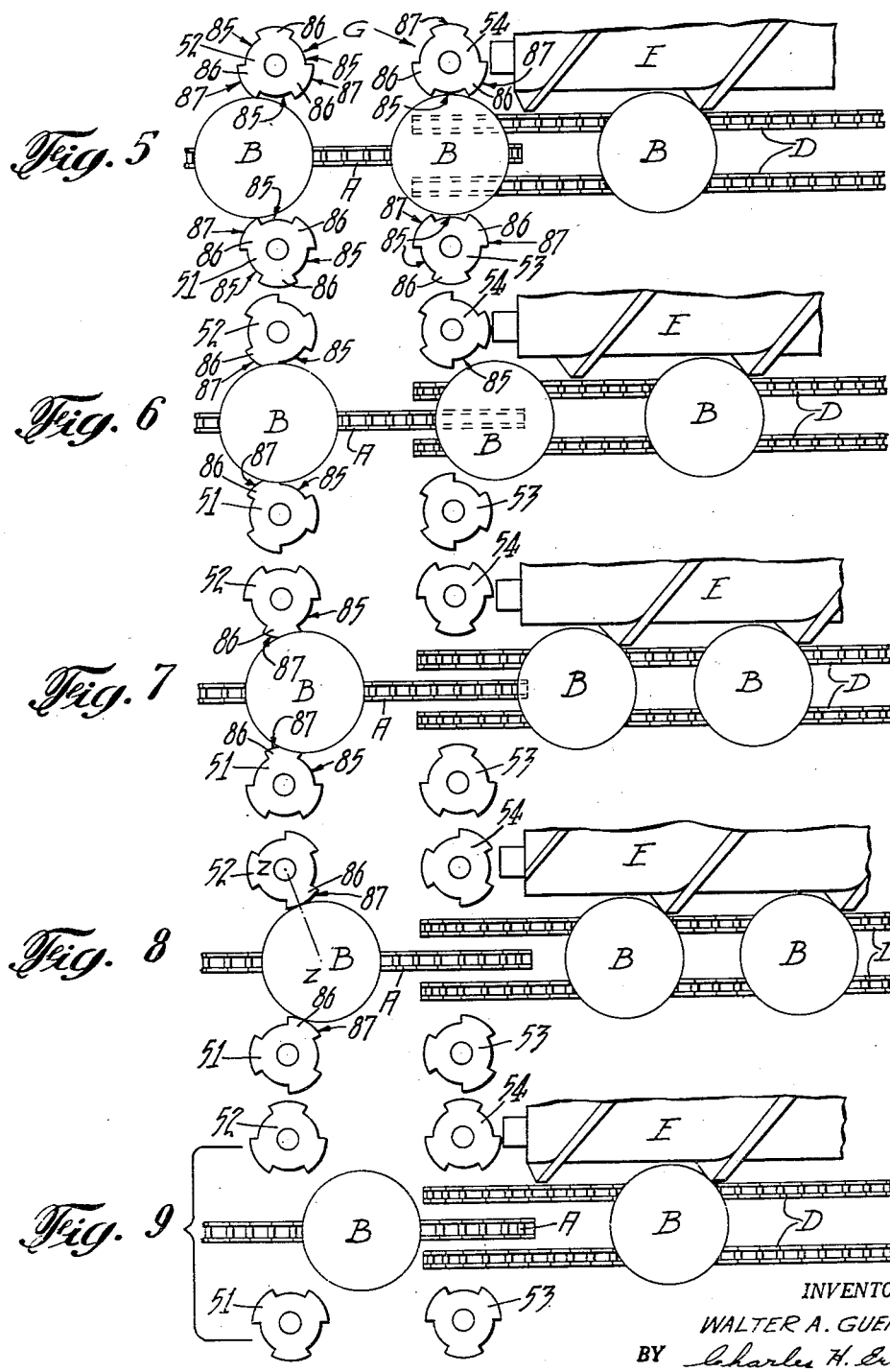

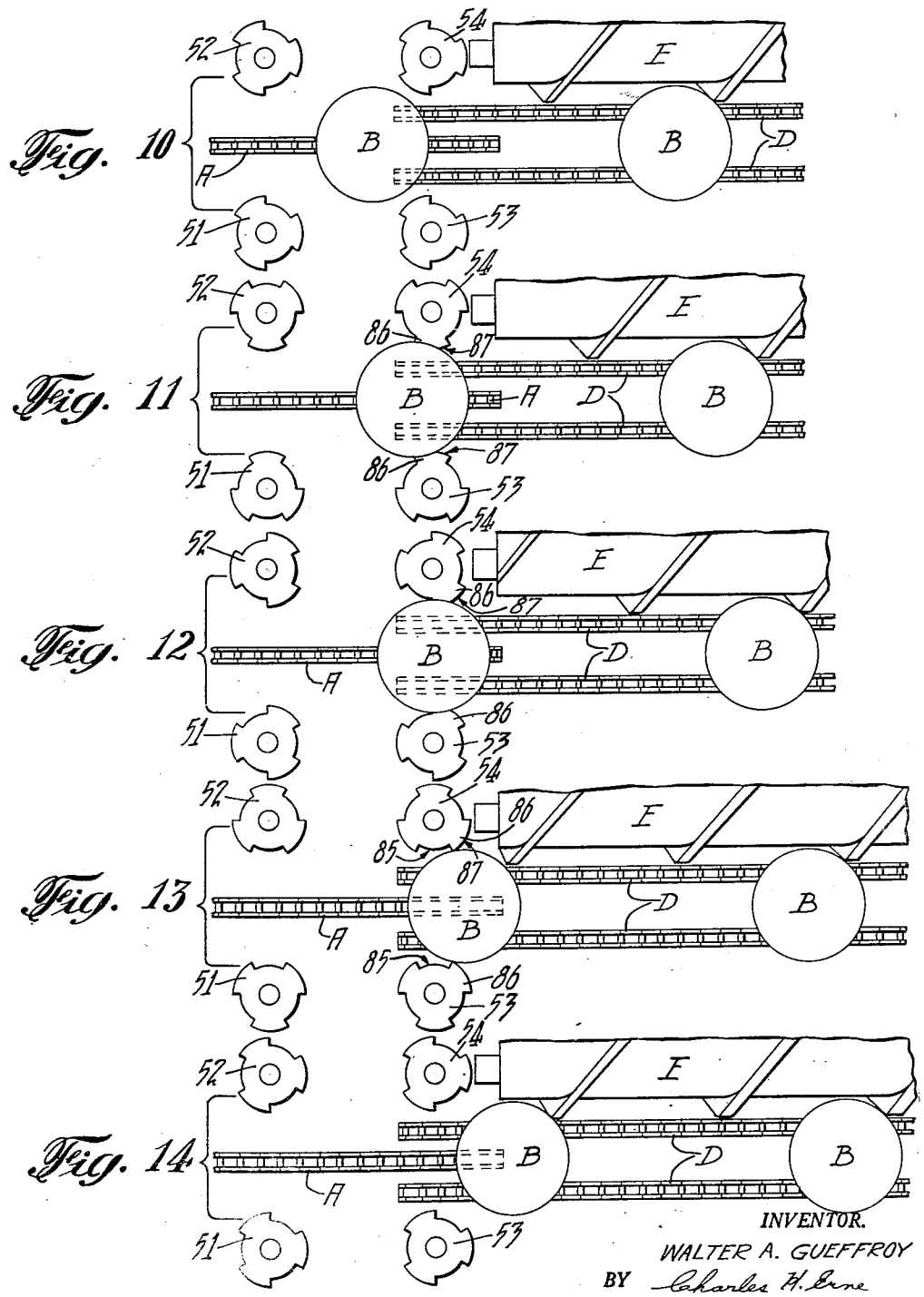

United States Patent Office 2,781,122
Patented Feb. 12, 1957

2,781,122

APPARATUS FOR TIMING AND FEEDING ARTICLES

Walter A. Gueffroy, Roslyn Heights, N. Y., assignor to American Can Company, New York, N. Y., a corporation of New Jersey Application December 11, 1952, Serial No. 325,471

7 Claims. (Cl. 198—34)

The present invention relates to an apparatus for feeding articles such as cans or containers moving along a path of travel in processional order into a timed feeding device of a subsequent operation machine and has particular reference to a rotary timing and indexing device for repositioning random spaced untimed articles without abrupt changes in their path of travel to coordinate them with the timed feeding devices for proper delivery thereto. This is a companion application to my copending United States application Serial No. 325,472, filed December 11, 1952, on Apparatus for Timing and Feeding Articles, and United States application Serial No. 325,473, filed December 11, 1952, on Apparatus for Timing and Feeding Articles, now Patent No. 2,679,313.

The invention contemplates the provision of a can or container timing and indexing device for use with a conveyor, preferably a straight line conveyor adapted to receive the cans or containers in random spaced and untimed relation from a source of supply such as a filling table where the cans are filled manually, and to deliver them in timed and processional order to an automatic machine such as a can or container closing machine.

An object of the invention is the provision in a conveyor apparatus of a timing and indexing device wherein random spacd untimed articles moving in processional order may be readily repositioned in timed and properly spaced order for proper reception by a timed feeding mechanism of a subsequent operation machine without arresting the travel of the articles.

Another object is the provision of such a timing and indexing device wherein untimed articles may be gradually brought into proper timed relation through a plurality of timing steps so that abrupt changes in the travel of the articles may be readily avoided and spilling of contents prevented thereby particularly adapting the device to the retiming of liquid filled cans or containers.

Numerous other objects and advantages of the invention will be apparent as it is better understood from the following description, which, taken in connection with the accompanying drawings, discloses a preferred embodiment thereof.

Referring to the drawings:

Figure 1 is a plan view of a conveyor mechanism embodying the timing and indexing device of the present invention, with parts broken away;

Fig. 2 is a longitudinal sectional view taken substantially along the line 2—2 in Fig. 1, with parts broken away;

Figs. 3 and 4 are enlarged transverse sectional views taken substantially along the respective lines 3—3, 4—4 in Fig. 2; and Figs. 5 to 14 inclusive are schematic views of portions of principal parts of the apparatus and illustrating the various steps in properly timing and indexing untimed cans or containers.

As a preferred or exemplary embodiment of the instant invention the drawings illustrate principal parts of a conventional straight line transfer conveyor A (Figs. 1 and 2) carrying random spaced, open top, liquid filled cylindrical cans B in processional order toward a connecting timed feeding device C comprising a feeding conveyor D and a feeding worm E of a subsequent operation machine. A timing and indexing mechanism F is disposed adjacent the transfer conveyor A on opposite sides thereof for respacing and timing the untimed cans B on the conveyor A for proper delivery into the feeding worm E in a manner which prevents spilling of the liquid contents of the cans. Although the drawings show the subsequent operation machine feeding device C having a worm E for controlling advancement of the timed cans B into the machine, the invention is equally well adapted to timing the cans B for entrance into a conventional feeding conveyor having feed dogs, or a star wheel, or other suitable feeding element.

The open, filled cans B, in an upright position, are advanced continuously through a horizontally disposed straight line open runway 11 having opposed, longitudinal, spaced and parallel, guide rails 12, 13 for guiding the cans in processional order. The runway 11 is supported on a frame 15 which may be a part of the main frame of the apparatus.

The transfer conveyor A, which receives the cans B from any suitable source of supply such as a previous operation machine or filling table, which discharges them in random spacings, preferably comprises a single endless chain 16 which extends from the previous operation machine or table and which operates over a sprocket 17 mounted on a horizontally disposed transverse shaft 18 journaled in a pair of spaced bearings 19 (Fig. 1) formed in the frame 15. The shaft 18 is rotated continuously in time with the feeding device C and the timing and indexing mechanism F in a manner which will be hereinafter explained.

The upper run of the transfer chain 16 operates in a longitudinal groove 21 (see also Figs. 3 and 4) formed in the floor of the floor of the runway 11, the groove 21 having a uniform depth slightly less than the depth of the chain so that the chain projects above the floor of the runway to support the cans clear of the floor. The transfer chain 16 has no feed dogs or other means of propelling the random spaced cans B carried thereon and depends solely upon the frictional engagement between the bottoms of the cans and the chain to advance the cans along the runway 11.

The feeding conveyor D of the feeding device C which receives the cans B from the transfer conveyor A, preferably comprises a pair of transversely spaced and parallel endless chains 27 (Figs. 1, 2 and 4) disposed in a horizontal position, one on each side of the discharge end of the transfer conveyor A. The upper runs of the chains 27 operate in a pair of spaced and parallel grooves 28 formed in the floor of the runway 11, the grooves 28 having a uniform depth slightly less than the depth of the chains so that the chains project slightly above the floor of the runway to support the cans B clear of the floor.

Adjacent the discharge end of the transfer conveyor A, the chains 27 of the feeding conveyor D overlap the transfer conveyor chain 16 and operate over a pair of spaced and parallel sprockets 29 (Figs. 1, 2 and 4) mounted on a transverse horizontal shaft 31 journaled in a set of three spaced bearings 32 (see Fig. 4) formed in the frame 15. The feeding conveyor chains 27 preferably serve as the driving medium for the entire apparatus, these chains 27 preferably being driven by the subsequent operation machine in any suitable manner.

The transfer conveyor A is driven in synchronism with the feeding conveyor D, preferably at substantially the same linear speed of travel so that cans B from the transfer conveyor A may be readily transferred to the feeding conveyor D at the overlap without stopping the travel of the cans. For this purpose the outer end of the transfer conveyor shaft 18 carries a sprocket 33 (Fig. 1) and the outer end of the feeding conveyor shaft 31 carries a sprocket 34 (see also Fig. 4), the sprockets being connected by an endless chain 35.

The feeding conveyor chains 27 have no feed dogs or other can propelling means but merely support the cans B received from the transfer conveyor A, and advance them through frictional contact between the chains and the bottoms of the cans. The primary purpose of the feeding chains 27 is to keep the cans in engagement with a helical thread 37 (Figs. 1, 2 and 4) on the timing worm E of the feeding device C. The thread projects into the path of the cans and engages a forward portion of each of the timed cans as it leaves the timing rolls so that the worm may control the advancement of the cans into the subsequent operation machine. The feeding conveyor D pushes the cans against the worm thread instead of the thread pushing against the cans. Thus the angular displacement of the cans and their susceptibility to jamming in the thread is overcome.

The worm E of the feeding device C is disposed adjacent the runway 11 and extends longitudinally of the feeding chains 27 with the helical thread 37 of the worm projecting into the path of travel of the cans B through the runway. The worm E is supported on a shaft 38 (Fig. 1) the ends of which are journalled in bearing brackets 39 secured to the frame 15. The worm is rotated continuously in time with the feeding conveyor D and the transfer conveyor A, through a bevel gear 42 (Figs. 1 and 2) which is mounted on one end of the worm shaft 38. The gear 42 meshes with and is driven by a bevel gear 43 carried on a stub shaft 44 journaled in a bearing 45 of the adjacent bearing bracket 39. The stub shaft 44 carries a sprocket 46 (see also Fig. 4) which is driven by an endless chain 47 operating over a driving sprocket 48 mounted on and rotating with the transfer conveyor shaft 18.

The timing and indexing mechanism F which repositions untimed cans B on the transfer conveyor A, is disposed adjacent the entrance end of the feeding worm E and functions to time the delivery of the cans to the worm so that they will not become jammed between the worm thread 37 and the side guide 12 of the runway 11. This timing of the cans preferably is effected in two stages although in some cases one stage may be sufficient and in other cases three or more may be more efficient, depending upon the diameter of the cans and their desired spacings. For this purpose the timing and indexing device F includes a pair of spaced and oppositely disposed timing elements G for each stage of timing and between which the cans B pass for timing.

By way of example, the drawings show two stages or sets of timing elements G, the first set comprising a pair of opposed timing rollers 51, 52 and the second set comprising a pair of opposed timing rollers 53, 54 (Fig. 1). The two sets of opposed timing rollers are longitudinally spaced apart a distance substantially equal to the proper spacings of the cans as they enter the feeding worm E. This usually is equal to the pitch of the first turn of the worm thread.

The set of timing rollers 51, 52 are disposed one on each side of the runway 11 and extend partially into openings 56 formed in the side guides 12, 13 of the runway. These timing rollers are mounted on the upper ends of vertically disposed shafts 58, 59 (Fig. 3) journaled in bearings 61 (see also Fig. 2) formed in the frame 15. At their lower ends the shafts 58, 59 carry bevel gears 62, 63 respectively which mesh with and are driven by respective bevel gears 64, 65 mounted on a cross-shaft 66 journaled in bearings 67 formed in the frame 15. The shaft 66 is continuously rotated by a sprocket 68 carried on one end of the shaft.

In a similar manner the set of timing rollers 53, 54 are partially disposed in opposed openings 69 (Fig. 1) in the side guides 12, 13 of the runway 11 and are mounted on the upper ends of vertically disposed shafts 72, 73 (Fig. 4) journaled in bearings 71 of the frame 15. At their lower ends the shafts 72, 73 carry bevel gears 74, 75 respectively which mesh with and are driven by respective bevel gears 76, 77 mounted on a cross-shaft 78 journaled in bearings 79 formed in the frame 15. The shaft 78 is continuously rotated by a sprocket 80 carried on one end of the shaft.

The sprockets 68 and 80 of the respective cross-shafts 66 and 78 are the same pitch diameter and are rotated in unison and in time with the transfer conveyor A by an endless chain 82 (Figs. 1, 2, 3 and 4) which is driven by a sprocket 83 on the transfer conveyor shaft 18. In this manner the timing rollers 51, 52, 53, 54 are rotated in unison in the same direction as the travel of the transfer conveyor A and in time with the transfer conveyor. The peripheral speed of the rollers however, is slower than the linear speed of travel of the conveyor A to effect a retarding action and the repositioning of the untimed cans B as will be more fully explained hereinafter.

Each timing roller 51, 52, 53, 54 is provided in its outer peripheral face with a plurality of equally spaced timing recesses 85 (Figs. 1 and 4) which set off between them equally spaced timing projections 86 having curved lands or outer faces 87 of equal length. By way of example, the timing rollers shown in the drawing are provided with three timing recesses 85 and three timing projections 86 each equal to substantially one-sixth of the circumference of the rollers, i. e. the portion of the circumference included in an angle of sixty degrees. The recesses 85 and the projections 86 on opposing rollers are aligned for cooperation and are timed with the feeding worm E so that each roller makes one-third of a revolution for each revolution of the worm E. During this one-third of a revolution of a timing roller, the transfer conveyor A advances a linear distance substantially equal to the distance between the centers of properly timed cans, i. e. the distance between the centers of cans being controlled by the worm E.

The depth of the timing recesses 85 is such that a properly timed can B disposed between a pair of opposed rollers and in the recesses will be free of any engagement with the rollers. In contrast to this condition, the timing projections 86 extend into the path of travel of the cans B in the runway 11 and are adapted to frictionally engage and be temporarily deformed by each untimed can which passes between the rollers. For this latter purpose the rollers 51, 52, 53, 54 are made of a resilient material, such as rubber or the like.

In operation, cans B being advanced by the transfer conveyor A and which by chance are in properly timed relation to the worm E, pass both sets of the rotating timing and indexing elements G in time with the rotation of opposed pairs of the recesses 85 through the runway 11 as best shown in Fig. 4 and in the second set of rollers in Fig. 5. Thus a properly timed can B advances with the transfer conveyor A past both sets of the timing and indexing elements G without interference and so is carried forward onto the feeding conveyor D and into the control of the worm E for further advancement into the subsequent operation machine without having its forward movement arrested at any time.

When a can B on the transfer conveyor A is out of time with the worm E, it approaches the first set of timing and indexing rollers 51, 52 in untimed relation to the rotation of the rollers and is engaged between opposed projections 86 of the rotating rollers as best shown in Fig. 5. As soon as the can is engaged by these projections 86, the control of the advancement of the can is diverted from the transfer conveyor A to the slower rotating timing rollers 51, 52. Hence the advancement of the can is continued but at the same time is retarded while the transfer conveyor slips under the can, the can being gently and steadily advanced at a slower speed so that no abrupt changes of speed or jolts that would spill the liquid take place. This retarded advancement of the can is effected by the rotation of the opposed set of rollers 51, 52 causing the lands 87 of the projections 86 to roll against the outside surface of the can wedged between the rollers. This rolling action is effected progressively as the rollers rotate as best shown by the various stages illustrated in Figs. 5, 6, 7 and 8.

When the timing rollers 51, 52 advance the can B to the position shown in Fig. 8, where the length of the line z—z in Fig. 8 is equal to the radius of the can plus the radius of the roller at the projection, the lands 87 of the projections 86 lose their frictional grip on the can and hence the can is released from the control of the timing rollers and is returned to the control of the transfer conveyor A. The can thus again travels with and at the speed of the transfer conveyor as shown in Figs. 9 and 10. The retarding action effected by the timing rollers 51, 52 however has caused a relative movement between the can and the transfer conveyor and hence when the conveyor again assumes control of the can it is in a different position on the conveyor.

In repositioning the can B on the transfer conveyor, it is the aim of the timing and indexing rollers to increase the space between the untimed can and the position of a properly timed can immediately ahead of it. It should be understood that an untimed can is either too close to or too far away from a properly timed can immediately ahead of it so that the space between the can centers is other than the proper distance or an exact multiple of the proper distance between timed can centers. If the space between the centers of adjacent cans is less than the exact proper space, the rear, untimed can engages a set of timing projections on the first set of timing rollers 51, 52 adjacent their trailing ends, and the retarding action of the first set of timing and indexing rollers 51, 52 may be sufficient to shift the untimed can backwardly into a properly timed position where it can enter the worm E without interference from the thread 37. Hence this repositioned can would pass between the second set of rollers 53, 54 without interference by proper coincidence with their recesses 85 and thus pass directly to the worm E.

Where the space between the centers of adjacent cans B is greater than the proper distance between the centers of timed cans, the untimed can must be retarded sufficiently to skip one space in the worm E and thus be repositioned on the transfer conveyor so that it is substantially two spaces from the timed can. In such cases, the total distance of correction, while less than a full space, may nevertheless be greater than that which can be efficiently handled in a single stage timing cycle, and the multiple stage cycle, such as the two stage cycle illustrated in the drawings must be used. In such a two stage cycle, the untimed can is retarded for at least one half the distance to be corrected at the first stage and retarded for the remainder of the distance at the second stage.

Thus if a can B is still out of time when it is returned to the control of the transfer conveyor A after release from the timing rollers 51, 52 it approaches the second set of timing rollers 53, 54 as shown in Fig. 10 and is wedged between the trailing end portions of a cooperating pair of the projections 86 on these rollers, as shown in Fig. 11. This second stage retarding action takes place progressively as shown in Figs. 11, 12, 13 in substantially the same manner as in the first stage timing rollers 51, 52 and again when the can reaches the position shown in Fig. 13 wherein it is in the same position relative to the rollers 53, 54 as it was to the first stage rollers as shown in Fig. 8, the can is released from the rollers 53, 54 and is returned to the control of the transfer conveyor A. However, the released can as it leaves the second stage timing rollers 53, 54 is in a properly timed position on the transfer conveyor A for reception by the worm E and is carried forward by the transfer conveyor in this timed relation for transfer to the feeding conveyor D and controlled by the worm E as shown in Fig. 14.

In this manner cans B in untimed positions on the transfer conveyor A are gently shifted into timed positions so that they may be readily delivered in timed relation to the feeding device C without jamming the cans or spilling their contents.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In an apparatus for receiving random spaced articles in processional order and for arranging them in timed order for timed advancement, the combination of a transfer conveyor having frictional engagement with the random spaced articles for advancing them along a predetermined path of travel, a pair of oppositely disposed rotatable timing elements located in direct transverse alignment one on each side of said transfer conveyor for the reception of said articles between them and operable at a peripheral speed differing from the speed of said transfer conveyor, each of said timing elements having a timing recess in the periphery thereof, said recesses being rotatable in opposite directions into oppositely aligned position for receiving and passing without engaging articles correctly positioned in timed relation on said transfer conveyor, each of said timing elements also having a timing projection disposed adjacent its recess, said projections extending into the path of travel of said articles and being rotatable into oppositely aligned position for engaging between them and changing the speed of advancement of an untimed article relative to said transfer conveyor to reposition said untimed article on said transfer conveyor in a more accurately timed position, and means for actuating said transfer conveyor and said timing elements in synchronism at said relative speeds.

2. In an apparatus for receiving random spaced containers in processional order and for arranging them in timed order for timed advancement, the combination of a transfer conveyor having frictional engagement with the random spaced containers for advancing them along a predetermined path of travel, a pair of oppositely disposed rotatable timing elements located in direct transverse alignment one on each side of said transfer conveyor for the reception of said containers between them and operable at a peripheral speed relatively slower than the speed of said transfer conveyor, each of said timing elements having a plurality of timing recesses in the periphery thereof, the recesses in the opposed timing elements being aligned for cooperative action for receiving and passing without engaging containers correctly positioned in timed relation on said transfer conveyor, a plurality of resilient deformable timing projections on said timing elements, said projections alternating with and setting off said timing recesses, the projections on the opposed elements extending into the path of travel of said containers and cooperating to engage between them and gently retard the advancement of an untimed container relative to said transfer conveyor to reposition said untimed container on said transfer conveyor in a more accurately timed position, and means for actuating said transfer conveyor and said timing elements in synchronism at said relative speeds.

3. In an apparatus for receiving random spaced containers in processional order and for arranging them in timed order for timed advancement, the combination of a transfer conveyor having frictional engagement with the random spaced containers for advancing them along a predetermined path of travel, a pair of oppositely disposed rotatable timing rollers located in direct transverse alignment one on each side of said transfer conveyor for the reception of said containers between them and operable at a peripheral speed relatively slower than the speed of said transfer conveyor, each of said timing rollers having a peripheral timing recess, said recesses being oppositely aligned for receiving and without engaging containers correctly positioned in timed relation on said transfer conveyor, each of said timing rollers also having a resilient deformable peripheral timing projection disposed adjacent its recess, said projections being oppositely aligned for engaging between them and gently retarding the advancement of an untimed container relative to said transfer conveyor to reposition said untimed container on said transfer conveyor in a more accurately timed position, and means for actuating said transfer conveyor and said timing rollers in synchronism at said relative speeds.

4. In an apparatus for receiving random spaced containers in processional order and for arranging them in timed order for timed advancement, the combination of a transfer conveyor having frictional engagement with the random spaced containers for advancing them along a predetermined path of travel, a pair of oppositely disposed rotatable timing rollers located in direct transverse alignment one on each side of said transfer conveyor for the reception of said containers between them and operable at a peripheral speed relatively slower than the speed of said transfer conveyor, each of said timing rollers having a plurality of circumferentially and equally spaced peripheral timing recesses of equal arcuate length, the recesses in the opposed timing rollers being aligned for cooperative action for receiving and passing without engaging containers correctly positioned in timed relation on said transfer conveyor, a plurality of circumferentially and equally spaced resilient deformable peripheral timing projections of equal arcuate length alternating with and setting off said timing recesses, the projections on the opposed elements cooperating to engage between them and gently retard the advancement of an untimed container relative to said transfer conveyor to reposition said untimed container on said transfer conveyor in a more accurately timed position, and means for actuating said transfer conveyor and said timing rollers in synchronism at said relative speeds.

5. In an apparatus for receiving random spaced containers in processional order and for arranging them in timed order for timed advancement, the combination of a transfer conveyor having frictional engagement with the random spaced containers for advancing them along a predetermined path of travel, a pair of oppositely disposed rotatable timing rollers located in direct transverse alignment one on each side of said transfer conveyor for the reception of said containers between them and operable at a peripheral speed relatively slower than the speed of said transfer conveyor, each of said timing rollers having a recess in the periphery thereof, said recesses being oppositely aligned for receiving and passing without engaging containers correctly positioned in timed relation on said transfer conveyor, each of said timing rollers also having a resilient projection disposed adjacent its recess and formed with an extended arcuate land, said projections extending into the path of travel of said containers and being oppositely aligned for engaging between said lands and gently retarding the advancement of an untimed container relative to said transfer conveyor to reposition said untimed container on said transfer conveyor in a more accurately timed position, and means for actuating said transfer conveyor and said timing rollers in synchronism at said relative speeds.

6. In an apparatus for receiving random spaced containers in processional order and for arranging them in timed order for timed advancement, the combination of a feeding device having spaced feeding elements for receiving and advancing containers in timed relation, a transfer conveyor disposed in longitudinal alignment with said feeding device and having frictional engagement with the random spaced containers for advancing them along a predetermined path of travel toward said feeding device, a plurality of sets of rotatable timing elements disposed in longitudinally spaced relation to each other along said transfer conveyor, each set comprising a pair of oppositely disposed timing elements located in direct transverse alignment one on each side of said transfer conveyor for the reception of said random spaced containers between them and operable at a peripheral speed relatively slower than the speed of said transfer conveyor, each of said timing elements having a recess in the periphery thereof, said recesses in each set of timing elements being oppositely aligned for receiving and passing without engaging containers correctly positioned in timed relation on said transfer conveyor, each of said timing elements also having a resilient projection disposed adjacent its recess, said projections of each set of timing elements being oppositely aligned and rotatable into the path of travel of said containers for engaging between them an untimed container to reposition said untimed container on said transfer conveyor in a more accurately timed position, said sets of timing elements as an untimed container passes between them successively repositioning the untimed container on said transfer conveyor into a substantially fully timed relation for timed delivery to said feeding device, and means for actuating said transfer conveyor, said feeding device and said timing elements in synchronism at said relative speeds.

7. In an apparatus for receiving random spaced containers in processional order and for arranging them in timed and correctly spaced order, the combination of a transfer conveyor having frictional engagement with the random spaced containers for advancing them along a predetermined path of travel; a plurality of pairs of rotatable timing elements, the elements of each pair being located in direct transverse alignment one on each side of said transfer conveyor and adjacent said path of the containers; a peripheral projection on each of said elements and movable into said path of the containers, said projection being aligned with an opposing like projection on its paired timing element for engaging between them and gently retarding only untimed containers for repositioning said untimed containers on said transfer conveyor; and means for actuating said transfer conveyor and said timing elements in synchronism with the peripheral speed of each timing element slower than the speed of said transfer conveyor and the summation of maximum retardation effective by all of said timing elements on an untimed container being substantially equal to the correct spacing between timed containers; whereby the position of each untimed container on said conveyor is at least partially corrected by some of the timing elements and is substantially fully corrected when it leaves the last pair of the timing elements.

References Cited in the file of this patent

UNITED STATES PATENTS

| | | |
|---|---|---|
| 1,667,991 | Russell | May 1, 1928 |
| 1,828,168 | Ayars | Oct. 20, 1931 |
| 2,524,248 | Albertoli | Oct. 3, 1950 |
| 2,585,124 | Hill | Feb. 12, 1952 |

FOREIGN PATENTS

| | | |
|---|---|---|
| 87,517 | Switzerland | Dec. 1, 1920 |
| 359,296 | Germany | Sept. 21, 1922 |